E. R. BRODTON.
MEANS FOR UTILIZING WATER PRESSURE.
APPLICATION FILED MAY 11, 1909.
996,056.
Patented June 27, 1911.
4 SHEETS—SHEET 2.
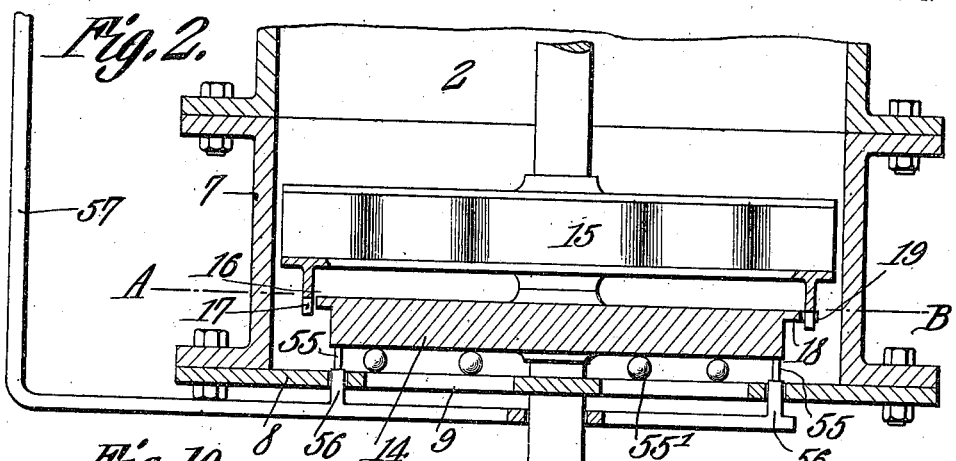
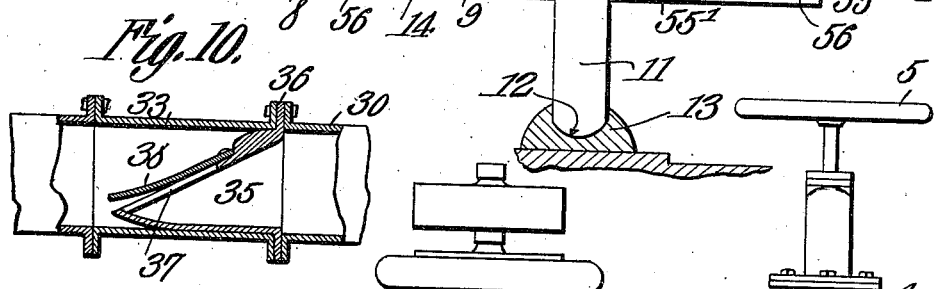
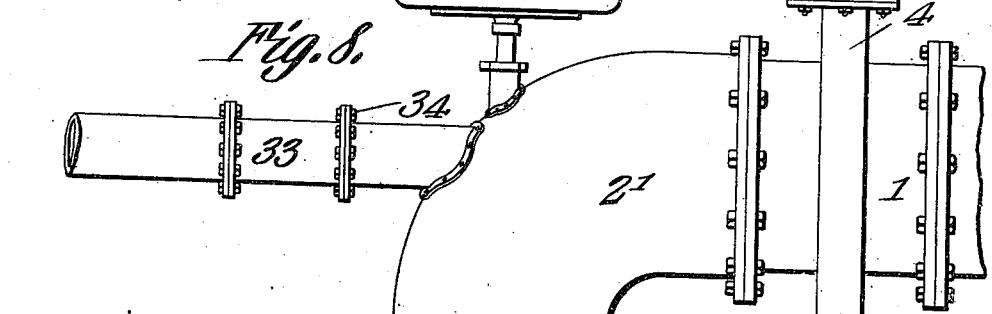
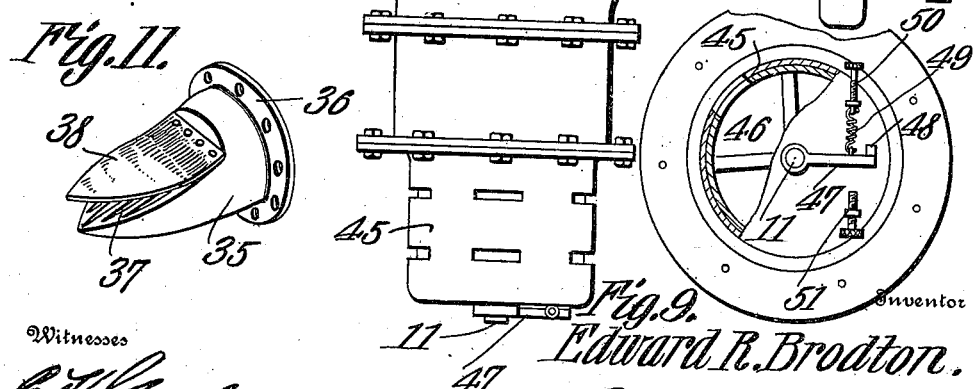
Witnesses
Inventor
Edward R. Brodton.
By C. A. Snow & Co.
Attorneys.

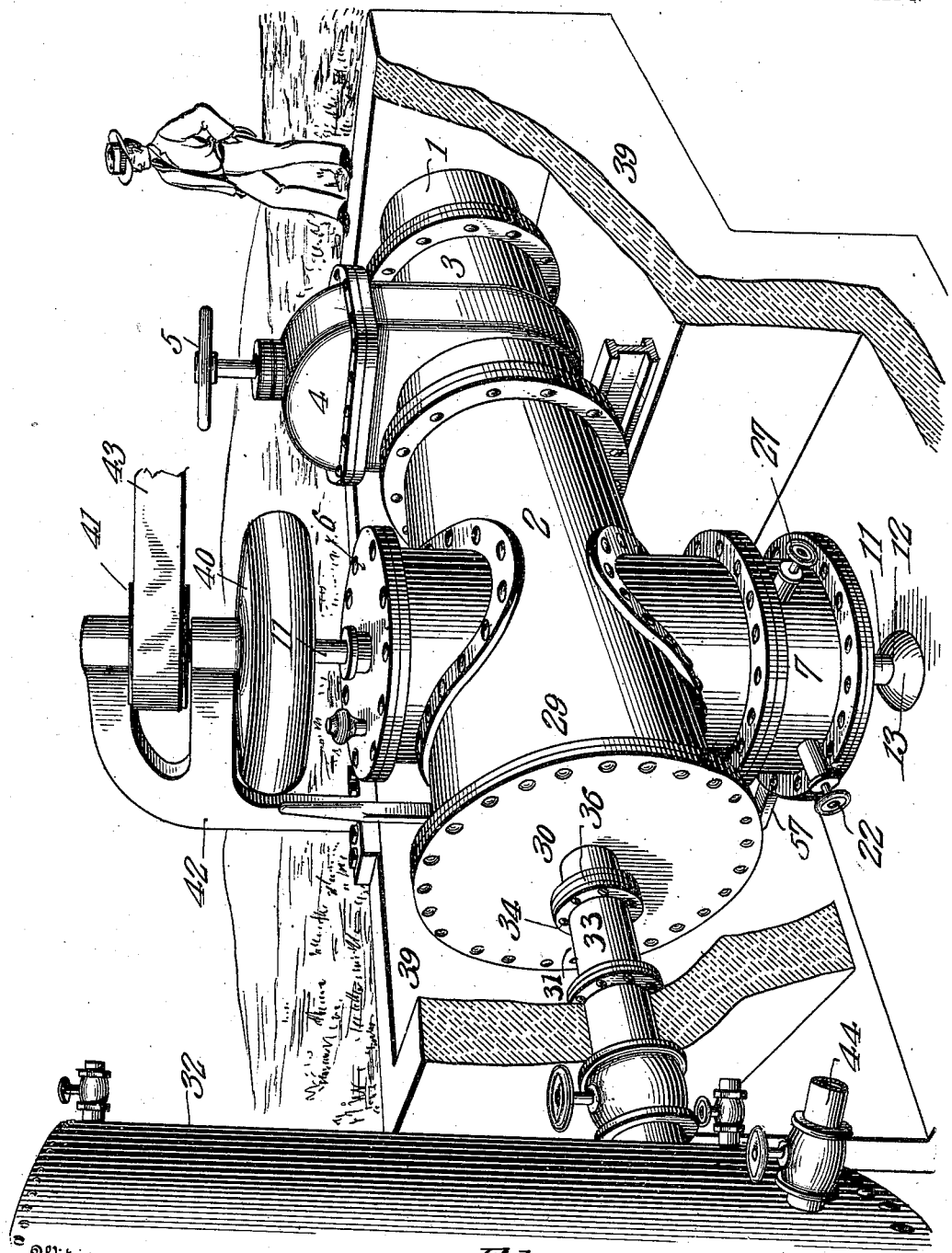

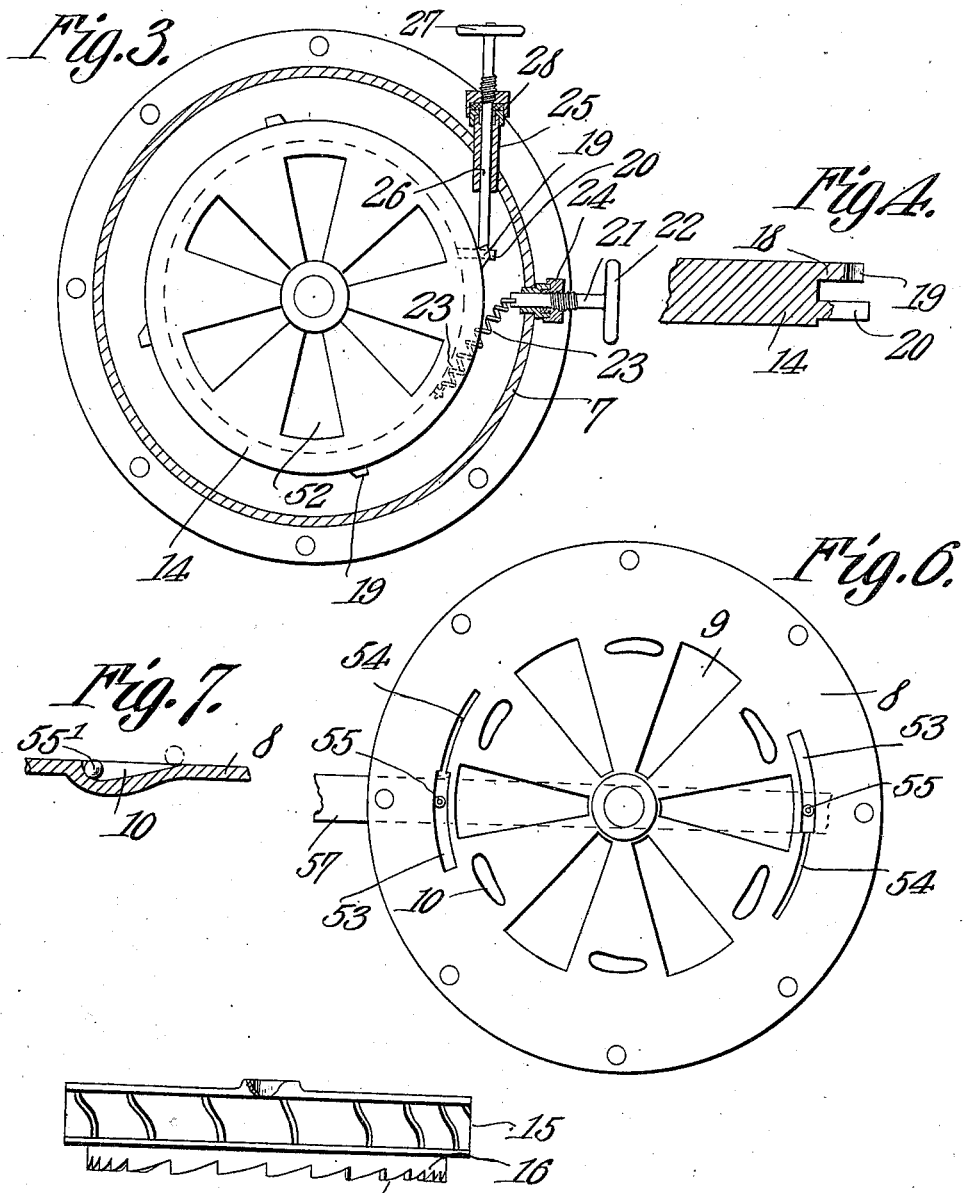

E. R. BRODTON.
MEANS FOR UTILIZING WATER PRESSURE.
APPLICATION FILED MAY 11, 1909.

996,056.

Patented June 27, 1911.

4 SHEETS—SHEET 4.

Witnesses
C. H. Stewart
F. T. Chapman

Inventor
Edward R. Brodton.

By C. A. Snow & Co.
Attorneys

UNITED STATES PATENT OFFICE.

EDWARD R. BRODTON, OF MOBILE, ALABAMA, ASSIGNOR TO THE MODERN ELECTRIC APPLIANCE COMPANY, OF MOBILE, ALABAMA.

MEANS FOR UTILIZING WATER-PRESSURE.

996,056.  Specification of Letters Patent.  Patented June 27, 1911.

Application filed May 11, 1909. Serial No. 495,315.

*To all whom it may concern:*

Be it known that I, EDWARD R. BRODTON, a citizen of the United States, residing at Mobile, in the county of Mobile and State of Alabama, have invented a new and useful Means for Utilizing Water-Pressure, of which the following is a specification.

This invention has reference to means for utilizing water pressure, especially flowing water under considerable head and its object is to provide a means for the storage of water and for utilizing the flow of water for the production of power when the storage features are not in use.

In accordance with the present invention the water under such head as may be present is led to a turbine wheel which in turn may drive a suitable electric generator, or power without being converted into electric current may be taken directly from the turbine wheel shaft, or both means of utilizing the power produced by the action of the water on the turbine wheel may be used. In connection with the turbine wheel there is provided a hydraulic ram, the turbine wheel being employed as an intermediary acted upon by the flowing water for operating the waste check valve of the hydraulic ram, while the hydraulic ram side of the apparatus is provided with means for modifying the back pressure of the storage side of the ram in a manner to put less load on the ram as the back pressure increases. Furthermore, the usual air bell of the ram is replaced by a storage tank of the closed type with imprisoned air so that such air not only acts as a means for forcing the water from the storage tank as needed but also operates as a cushion for the ram.

Figure 12:
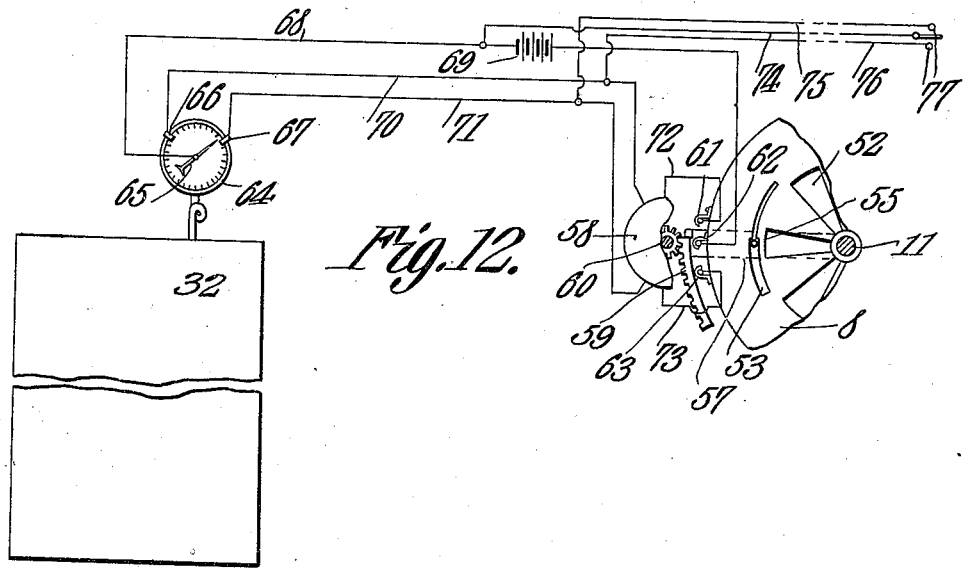
Figure 13:
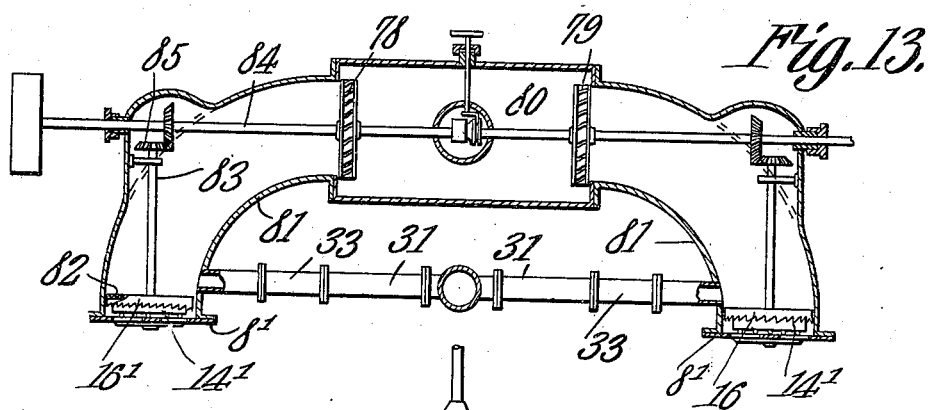
Figure 14:
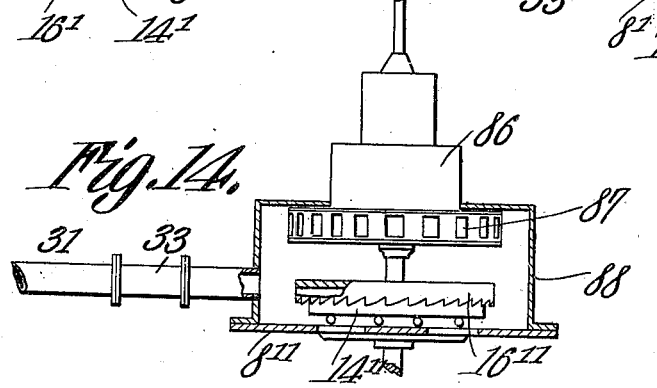

The invention will be best understood from a consideration of the following detail description taken in connection with the accompanying drawings, forming a part of this specification, in which drawings, Figure 1 is a perspective view illustrating the combined power and storage system forming the subject matter of the present invention. Fig. 2 is a central section of a combined turbine wheel and waste check valve for a hydraulic ram, Fig. 3 is a section on the line A—B of Fig. 2 with parts omitted and other parts in elevation. Fig. 4 is a detail section of one edge of the valve disk shown in Figs. 2 and 3. Fig. 5 is a side elevation with parts in section of a turbine wheel. Fig. 6 is a plan view of the stationary valve member below the turbine wheel and movable valve member. Fig. 7 is a detail sectional view of one of the ball pockets formed in the stationary valve member shown in Fig. 6. Fig. 8 is an elevation of a somewhat different form of waste check valve mechanism for use in connection with the turbine and ram. Fig. 9 is a bottom plan view of the discharge end of the structure of Fig. 8, with parts in section. Fig. 10 is a longitudinal section through the regulating check valve leading to the storage tank. Fig. 11 is a perspective view of the check valve shown in Fig. 10 with the valve partially raised. Fig. 12 is a partly structural diagram showing an automatic means for putting the ram or turbine into and out of action. Fig. 13 is a section of a type of turbine showing the invention applied. Fig. 14 is a view partly in vertical section of another type of turbine with the invention applied.

In localities where an ample supply of water under suitable head is available the hydraulic ram is one of if not the most economical means for elevating water or for storing water in closed reservoirs or tanks against air pressure so that the water may be withdrawn from the tanks from time to time as needed under the pressure developed in the tank by the air compressed therein. However such hydraulic rams are practicable only in comparatively small sizes because of mechanical and other difficulties. Furthermore, the ram can be used for no other purpose than the elevation of water or the forcing of the same against pressure in a storage tank. If the ram be made of large capacity, much larger than is customary then such a ram need be used but a short time to store the desired supply of water and would therefore remain idle through comparatively long periods.

With the structure of the present invention the water head may be utilized for the production of power, either electrical or mechanical or both, when the ram is not being used, a turbine wheel being provided for this purpose, and such turbine wheel is further utilized for operating a check valve at the waste port of the hydraulic ram chamber in such manner as to ease the shock of the sudden stoppage of the check valve utilized to divert the water lodged in the ram chamber to the conduit leading to the storage tank or reservoir. For this purpose water may be brought to the apparatus through a suitable pipe or conduit 1 coming from a suitable source of water supply and this pipe or conduit should be of ample size for the purpose. This pipe leads to a casing 2, which in Fig. 1 is shown as in the shape of a cross coupling, there being interposed in the pipe 1 a short section 3 including the casing 4 of a quick acting valve which may be of the gate type and may be under the control of a hand wheel 5, which wheel, of course, may be replaced by an ordinary hand lever such as is commonly used in valves. The valve 4 should be of such construction as to offer no impediment to the flow of water through the conduit 1 when the valve is opened.

The casing 2 is shown as disposed vertically while the pipe 1 enters the same from one side. The casing 2 is flanged both top and bottom and at the top is provided with a cap 6 suitably secured thereto in the manner customary in such structures and at the bottom the casing 2 is secured thereto in alinement therewith a short cylindrical member 7 to the bottom of which is made fast a disk 8 in which there is formed a circular series of passages 9 which, in the particular structure shown in Fig. 6 are indicated as sector passages radiating from a central point toward the periphery of the disk and expanding in such direction. Formed in the upper face of the disk 8 near and between the outer ends of the slots or passages 9 is a circular series of depressions 10 each gradually increasing in depth from one end toward the other as best indicated in Fig. 7.

Extending axially through the casing 2 and through a suitable packing gland in the cap plate 6 and through a suitable bearing in the disk 8 is a shaft 11 stepped at the lower end in a bearing 12 below the disk 8 and supported on a suitable pedestal 13. Mounted on the shaft 11 above the disk 8 is another disk 14 and above the disk 14 the shaft 11 carries a turbine wheel 15, the disk 14 being loose on the shaft but the turbine wheel 15 is fast thereon. The turbine wheel 15 carries on its under face an annular flange 16 formed on the edge remote from the turbine wheel with a circular series of ratchet teeth 17, these teeth being of the type where one face is inclined and meets an abrupt shoulder of the next tooth. The disk 14 is formed with a peripheral flange 18 forming a continuation of its upper face and this flange is formed along the edge with ratchet teeth 19 adapted to be engaged by the teeth 17 on the flange 16 of the turbine wheel 15. Below the flange 19 the disk 14 is provided with a single tooth 20 projecting substantially radially therefrom.

Extending through the casing 7 at a point adjacent to the disk 14 is a screw rod 21 provided at its outer end with a hand wheel 22 for convenient manipulation and at the inner end this screw rod is connected to the disk 14 by a spring 23, this spring tending at all times to maintain the disk in a predetermined position. To prevent the passage of water from the interior of the casing to the exterior thereof at the point where the screw rod 21 passes through said casing, a suitable packing gland 24 is provided.

Extending through the casing 7 at an angle thereto is a sleeve 25 in water-tight relation thereto and this sleeve serves to guide a rod 26 with the inner end in operative relation to the stop 20 while the outer end beyond the casing 7 is provided with a manipulating wheel 27. This rod is also screw threaded and passes through a packing gland 28.

Opposite the pipe 1 the casing 2 is formed with a neck 29 terminating in a head 30 from which leads a pipe 31 entering a tank 32. The pipe 31 includes a short section 33 flanged at each end and secured to meeting flanges on the pipe 31, the pipe section 33 being connected to the main pipe 31 by suitable bolts 34. Within the pipe 31 there is lodged a sleeve 35 having at one end a radial flange 36 adapted to be clamped between the meeting ends of the pipe section 33 and the portion of the pipe 31 adjacent to the neck 29. The end of the sleeve 35 remote from the flange 36 is reduced in diameter and is closed except for a series of parallel slots 37, these slots being arranged so that this end of the sleeve is inclined at an angle to the length of the sleeve. Fast to the slotted end of the sleeve is a flap valve 38 secured at one end to a blank portion of the closure for this end of the sleeve by bolts or otherwise while that end of the valve remote from the secured end is free to move to and from the slotted portion of the sleeve as necessary. This flap valve 38 is made of rubber or some other suitable flexible material and when closed down on the slotted end of the sleeve the said end is completely closed by said valve. This valve 38 constitutes the check valve for the delivery end of the ram.

The casing 2 as well as the pipe 1 is lodged within a suitable inclosure 39 which is preferably made of cement but may be made of any other suitable material and the several parts are suitably supported and housed within this inclosure which inclosure, though not so shown, is in practice covered by a suitable roof.

Above the casing 2 the shaft 11 carries an electric generator or dynamo 40 and also a pulley 41. The stator of the dynamo 40 and suitable journal bearings for the upper end of the shaft 11 are carried by a post or standard 42 erected on the inclosure 39 in position to overhang the casing 2. A belt 43 applied to the pulley 41 may be utilized for the purpose of transmitting power from said pulley to a point of application. The tank 32 is connected through a pipe or conduit 44 with any suitable system of distribution of water under pressure.

The structure shown in Fig. 8 differs from that shown in Fig. 1 in some details but not in the general principle of operation. In this modification the casing 2 is replaced by an elbow 2' while the disk 14 which constitutes the waste check valve of the ram is somewhat modified. There is a turbine 15 housed within the casing extension 2 as in the structure shown in Figs. 1 and 2, but the disk 8 is replaced by a perforated cylindrical housing 45 in which is lodged a perforated cylindrical valve or drum 46 capable of being rotated on the shaft 11 as an axis. Below the bottom of the casing 45 the shaft 11 carries an arm 47 in the path of which there is disposed a stop 48 projecting from the bottom of the casing 45. A spring 49 under the control of a screw rod 50 controls the movement of this arm while a stop screw 51 limits the movement of this arm in a direction to extend the spring against its normal tendency.

By a suitable manipulation of the screw rods 21 and 26 the tension of the spring 23 and the normal position of the disk 14 under the action of the spring 23 is determined.

The disk 14 is provided with slots or perforations 52 matching the perforations 9 in the disk or plate 8. Furthermore, the plate or disk 8 is provided with curved slots 53 each provided with an extension 54 of less width while the disk 14 is provided with pins 55 extending through these slots and these pins have shouldered portions 56 capable of freely moving through the slots 53 but of too great diameter to move through the slot extensions 54. These pins may be connected to a manipulating lever 57.

Let it be supposed that it is desirable to fill the tank 32 with water against a body of air confined in the tank. The valve 4 is opened and the water coming through the conduit 1 enters the casing 2 and passing through the turbine wheel 15 finds ready escape through the perforations in the disk 14 which at this time is in the elevated position. This will cause a rotative movement of the turbine wheel 15 but the like movement of the disk 14 is resisted by the action of the spring 23. The rotative movement of the turbine 15 will cause the teeth 17 to ride along the teeth 19 of the disk 14 thus depressing the disk while at the same time imparting a limited rotative movement thereto. This movement is in a direction to cause balls 55' lodged between the disk 14 and the plate 8 to move along the depressions 10 from the shallow end of the latter toward the deeper end. The disk 14 will therefore be moved toward the plate 8 and at the same time given a slight rotative movement sufficient to cause the slots or openings 52 of the disk 14 to move into coincidence with the spaces between the slots or openings 9 in the plate 8 by the time the disk 14 has come into contact with said plate 8, the parts being so proportioned that this takes place as the teeth 17 escape from the teeth 19. This action causes a stoppage of the water flowing through the conduit 1 at the waste end of the casing 2 and consequently the shock thus imparted to the water will cause it to be diverted into the pipe 31 and so through the sleeve 35 and past the valve 38. When the pressure becomes equalized then the spring 23 will act to return the disk 14 to its normal position, the balls 55' riding up the inclines of the notches 10 causing the rising of the disk to its first position. Water now again finds escape through the waste end of the casing 2 and the action just described is repeated with the result that another portion of water is forced through the sleeve 35 and beyond the valve 38. The mechanism thus operates after the manner of an ordinary hydraulic valve except that there is a slower closing of the check valve at the waste end of the ram chamber than takes place with the ordinary check valve moving unresisted to its seat. Because of the cushioning of the valve member 14 due to its sluggish movement to the closed position, the parts are not subjected to the hammer action which takes place in the ordinary hydraulic ram. Consequently the structure may be made of very large capacity without destructive action on the parts and without the necessity of greatly enlarging various portions of the structure to resist the great strains to which such structures are usually subjected. When the back pressure within the tank 32 increases, then the valve 38 does not open to so great an extent under the action of the ram and consequently the superficial area of resistance to the ram is correspondingly decreased. This is due to the flexibility of the valve member 38 and its fixed connection at one end to the valve casing so that as the pressure becomes high only a very small portion of the free end or lip of the valve member will open, the valve becoming progressively more resistant to movement as the fixed end is approached, and the water has therefore to overcome only a small area of resistance. By making the delivery end of the valve of the sleeve 35 slotted it provides a broad bearing surface for the valve 38 so that the latter may be made of quite flexible material.

So far considered the mechanism operates simply as a hydraulic ram with however the shocks and jars greatly reduced. Now let it be supposed that the tank 32 has been filled to the desired extent then the valve 4, which has already been opened to permit the action of the ram, is closed, but if it is desired to develop power from the running water without causing the action of the ram then when the disk 14 constituting the waste check valve of the ram, is in its lowermost position the lever 57 is manipulated to carry the disk still farther in its rotative movement so that the shouldered end of the pins 55 will engage under the plate 8 at the ends 54 of the slots 53 thus locking the disk against responding to the action of the spring 23, and in the meantime the rod 21 may be so manipulated as to relieve the spring 23 from tension thus preventing it from then acting on the disk 14 to return it to initial position after having been actuated by the turbine wheel 15. This additional rotative movement of the valve disk 14 is sufficient to bring the slots or perforations 52 again into coincidence with the slots or perforations 9 in the plate 8 so that water flowing through the turbine wheel 15 has free escape through the waste opening of the chamber 2. Under these conditions the turbine wheel will continue to rotate and will develop power by rotating the armature of the generator 40 and power may also be taken away from the shaft 11 by means of the belt 43 applied to the pulley 41. Since the waste end of the ram chamber 2 is now opened constantly the turbine will continue to operate while the ram action of the device is thrown out of operation. By this means the apparatus is capable of generating power constantly either through the turbine wheel as a prime mover or through the ram for the storage of water in a suitable reservoir or tank.

Because of the freedom of the apparatus from destructive hammering the structure may be made of very large capacity when the supply of water is sufficient and the water head is ample.

An important feature of the structure herein disclosed resides in the fact that no separate air bell is necessary for the ram since the air cushion formed in the tank 32 is ample for the purpose, the air bell thus forming the storage tank for the water delivered by the ram, and is made of sufficient capacity to contain all the water designed to be stored at any one time. Because of the large capacity of the ram the tank 32 may be filled in a short time and during the greater portion of the time the device may be used for the generation of power, either electrical or mechanical, which power may be utilized for any desired purpose. Furthermore, the apparatus is designed to be constructed of parts which are almost entirely of stock size so that the structure may be assembled quickly and cheaply and also quickly and cheaply repaired should any part become damaged or worn out.

The screw rod 26 is provided for the purpose of limiting and adjusting the movement of the valve plate or disk 14 so that the extent of relative opening of the waste passage may be determined at will. By making the screw section of the rod 26 of sufficient length this same rod may be utilized for controlling the valve disk 14 when it is operating as a controlling valve for the turbine wheel itself.

Instead of operating the lever 57 by hand, provision may be made for the automatic operation of this lever to throw the ram out of action when the pressure within the tank 32 has reached a predetermined maximum and to then throw the turbine into action as an ordinary turbine, and further to cut out the action of the turbine as an ordinary turbine when the pressure has reached a predetermined minimum within the tank or reservoir 32 and to then cut in the ram to action again. For this purpose there may be provided an electric motor 58 suitably supported by the casing member 7 while the lever 57 is provided outside the margin of the casing with a curved rack 59 concentric with the axis of rotation of the lever about the shaft 11. The armature shaft of the motor carries a pinion 60 adapted under certain circumstances to engage the rack 59. In the path of the rack are arranged contact fingers 61, 62 and 63.

The tank or reservoir 32 is provided with a pressure gage 64 which may be taken as typical of any device responsive to either pressure or differences in water level since, so far as the present invention is concerned, either a pressure gage or a water level float may be used indifferently. In the path of the indicating needle 65 of the gage are two contacts 66 and 67 which may be of the type that can be adjusted to any desired point in the range of movement of the indicator 65. Assume that the indicator 65 is connected by a conductor 68 through a battery 69 or other source of electrical energy, to the contact finger 62 and also that the adjustable contacts 66 and 67 are connected by respective conductors 70 and 71 to the motor in such manner as to cause the current to pass through either the field or armature of the motor in opposite directions in accordance with which contact 66 or 67 is in circuit with the battery 69. The other contact fingers 61 and 63 are connected by respective conductors 72 and 73 to the motor so as to complete the circuit therethrough by way of the conductors 70 or 71 as the case may be. Branched off from the conductors 68, 70 and 71 are other conductors 74, 75 and 76 respectively, leading to any desired distant point where the conductors may be coupled together, say the conductor 74 to either but not both of the conductors 75 and 76 through a suitable switch 77. While the indicator hand or pointer 65 is out of contact with either of the terminals 66 or 67, no current passes to the motor 58 but when the pointer 65 is in engagement with the contact 66 then there is established a circuit from the battery 69 through the conductor 68 to the finger 62, thence by way of the rack 59 should the rack at that time be in engagement with the finger 61, and by way of the conductor 72 to the motor thence by way of the conductor 70 back to the contact finger 66 and to the pointer 65. Should the pointer be in engagement with the contact 67 then the current may be traced from thence by the conductor 71 to the motor and by the conductor 73 to the finger 63 thence by the rack 59 to the finger 62 and by way of the conductor 68 through the battery 69 and back to the contact finger 65.

Let it be supposed that the pressure in the tank 32 is rising until the finger 65 moves over the face of the gage 64 and until it makes contact with the contact terminal 67. When the valve disk 14 is depressed it makes a partial rotation bringing the pins 55 adjacent to the narrow slot portion 54 through the disk 8 and when the valve disk 14 is in engagement with the disk 8 so as to close the waste port of the ram the rack 59 is brought into initial engagement with the pinion 60. In this position of the parts the circuit through the motor 58 is closed and the motor is running in a direction to cause the pinion 60 to engage the rack 59 and propel the arm or lever 57 in a direction to carry the shoulder portion 56 of the pin 55 under the disk 8 with the thinner portion of the pin 55 lodged within the slot extension 54. Under these circumstances the waste port of the ram is open but the valve disk 14 is locked against rising and consequently the ram is put out of service but the continued flow of water through the casing 2 will cause the actuation of the turbine in the ordinary manner, the turbine thus generating power either directly or through the generator 40. As the motor 58 continues to run the contact finger 63 is ultimately passed by the rack so that the circuit at this point is broken and the motor stops. If now water be used from the tank 32 until the pressure therein drops to a predetermined minimum the circuit through the motor is again established by the pointer or hand 65 making engagement with the contact terminal 66, the rack 59 having in the meantime completed the circuit through the contact finger 61. The motor now runs in the reverse direction moving the arm 57 in a direction to carry the pin 55 to the larger portion 53 of the slot through the disk 8 and just as the pinion 60 disengages from the teeth of the rack 59 the rack moves from engagement with the contact finger 61 thus breaking the motor circuit and stopping the motor. Now the spring 23 comes into action and causes the rising of the disk 14 in such manner that the ram will begin to operate as already described and will continue to operate until the pressure within the tank 32 again rises to the maximum and the turbine is again put into action to rotate continuously by the locking down of the disk 14.

Referring to Fig. 13 there is shown another type of turbine wheel where two turbine wheels 78 and 79 receive water from a common chamber 80 and each turbine wheel has its own exhaust pipe or conduit 81. The open end of the conduit 81 carries a disk 82 on a shaft 83 connected to the turbine shaft 84 through miter gears 85 so that the disk receives motion from the respective turbine wheel 78. The disk 82 carries a ratchet flange 16' and the discharge end of the flue 81 is provided with a perforated disk 8' together with the ram valve disk 14'.

In Fig. 14 a turbine is indicated at 86 and its discharge ports 87 are inclosed in a supplemental casing 88 also inclosing a disk 82' having a ratchet flange 16'' with an end inclosing disk 8'' and a valve disk 14''.

The structures shown in Figs. 13 and 14 as well as the structures shown in the other views are deemed as sufficient to illustrate the wide range of apparatus to which the invention is adapted.

It will of course be understood that the waste check valve for the ram may be modified in structure to adapt it to other types of turbine wheels but in all cases the general principle of operation will be retained.

What is claimed is:—

1. A means for utilizing water pressure comprising a hydraulic ram, a waste check valve therefor having a normal tendency toward the open position, a water wheel mounted in the ram casing in advance of the waste valve of the ram, and connections between the water wheel and the valve whereby the valve is actuated by the water wheel toward the closed position against its normal tendency.

2. A means for utilizing water pressure, comprising a hydraulic ram, a water wheel in the ram casing, and a waste valve for the ram actuated by the water wheel and also movable to an inactive open position out of the control of the water wheel.

3. An apparatus for utilizing water pressure comprising a hydraulic ram, a waste check valve therefor, means for imparting to the waste valve a normal tendency toward the open position, a turbine water wheel in the ram casing in advance of the waste valve and in position to be traversed by all the water passing to the waste valve of the ram, and connections between the wheel and the valve for moving the latter toward the closed position against its normal tendency.

4. A means for utilizing water pressure, comprising a hydraulic ram, a pressure storage tank into which the ram discharges, and a check valve between the ram and the storage tank comprising a casing reducing in diameter in the direction of the flow of the water therethrough and there formed with a series of parallel slots and a movable valve member fixed at one end to the casing and overlying the slots, said valve member being yieldable progressively toward the other or free end.

5. A means for utilizing water pressure comprising a hydraulic ram, a water wheel in the ram casing, a check valve for the waste side of the hydraulic ram, connections between the water wheel and the check valve for operating the latter by the action of the water on the water wheel, and means for controlling the valve independent of the water wheel.

6. In a device for utilizing water pressure, a hydraulic ram, a water wheel in the ram casing, a waste valve for the ram actuated by the water wheel, means for controlling the waste valve independent of the water wheel, a pressure tank into which the ram discharges, and a check valve between the ram and storage tank automatically conforming in the extent of its free opening to the back pressure developed in the storage tank.

7. A means for utilizing water pressure comprising a hydraulic ram, a water wheel in the ram casing, a waste valve for the ram actuated by the water wheel, means controlling the valve independent of the water wheel, and means controlled by the water wheel for transforming the water pressure into other forms of useful energy.

8. A means for utilizing water pressure comprising a hydraulic ram, a water wheel in the ram casing, a waste valve for the ram actuated by the water wheel, means for controlling the waste valve independent of the water wheel, means controlled by the water wheel for converting water pressure into other forms of useful energy, a pressure storage tank, connections between the storage tank and the discharge side of the ram, and a check valve in the connections between the ram and storage tank having means for automatically varying its effective discharge area in accordance with the back pressure developed in the storage tank.

9. A means for utilizing water pressure comprising a hydraulic ram, a water wheel capable of converting water pressure into useful work, a waste check valve for the ram and controlled by the water wheel, and other means for controlling the valve responsive to predetermined maximum and minimum conditions on the storage side of the ram.

10. A means for utilizing water pressure comprising a hydraulic ram, a water wheel capable of converting water pressure into useful work and controlling the waste check valve of the ram, a pressure storage tank for water delivered by the ram, and means controlled by maximum and minimum conditions in the pressure tank for putting the ram and water wheel into and out of service alternately.

11. An apparatus for utilizing water pressure comprising a water wheel capable of converting water pressure into useful work, a hydraulic ram having a waste check valve controlled by the water wheel, a pressure tank into which the ram delivers, and means controlled by maximum and minimum predetermined pressure in the pressure tank for moving the waste check valve of the ram into and out of active position.

12. A means for utilizing water pressure comprising a water wheel capable of converting water pressure into useful work, a hydraulic ram having a waste check valve controlled by the water wheel and movable to a position active to the water wheel but inactive to the ram, an electric motor active to move the waste check valve to and from the position of inactivity to the ram, and a circuit controller for the motor responsive to predetermined maximum and minimum conditions on the storage side of the ram.

In testimony that I claim the foregoing as my own, I have hereto affixed my signature in the presence of two witnesses.

EDWARD R. BRODTON.

Witnesses:
E. HUME TALBERT,
E. C. SCHLADT.